United States Patent [19]

Damino

[11] Patent Number: 5,149,310
[45] Date of Patent: Sep. 22, 1992

[54] DIFFERENTIAL SPEED REDUCER

[76] Inventor: Cesar U. Damino, 8181 Wayne Rd., Apt. L1114, Westland, Mich. 48185

[21] Appl. No.: 703,813

[22] Filed: May 21, 1991

[51] Int. Cl.⁵ .................. F16H 1/28; F16H 37/10
[52] U.S. Cl. .......................... 475/329; 475/9
[58] Field of Search .......... 74/420, 664, 665 P, 74/665 B; 475/9, 329, 336, 343, 248

[56] References Cited

U.S. PATENT DOCUMENTS

| | | | |
|---|---|---|---|
| 1,494,065 | 5/1924 | Grafström | 475/329 X |
| 3,359,828 | 12/1967 | Waite | 475/9 X |
| 4,310,146 | 1/1982 | F'Geppert | 475/329 X |

FOREIGN PATENT DOCUMENTS

| | | | |
|---|---|---|---|
| 1099133 | 8/1955 | France | 475/329 |
| 62-88852 | 4/1987 | Japan | 475/329 |

*Primary Examiner*—Leslie A. Braun
*Assistant Examiner*—David E. Henn
*Attorney, Agent, or Firm*—Collard & Roe

[57] ABSTRACT

A differential speed reducer with an input shaft connected to two spur gears. An inverter gear is engaged with the first spur gear. The second spur gear and the inverter gear drive a third and fourth spur gear which are freely rotatable on an output shaft. A bevel gear is attached to each of the third and fourth gears. A pinion gear rotates between the bevel gears and as it orbits, turns the output shaft.

9 Claims, 3 Drawing Sheets

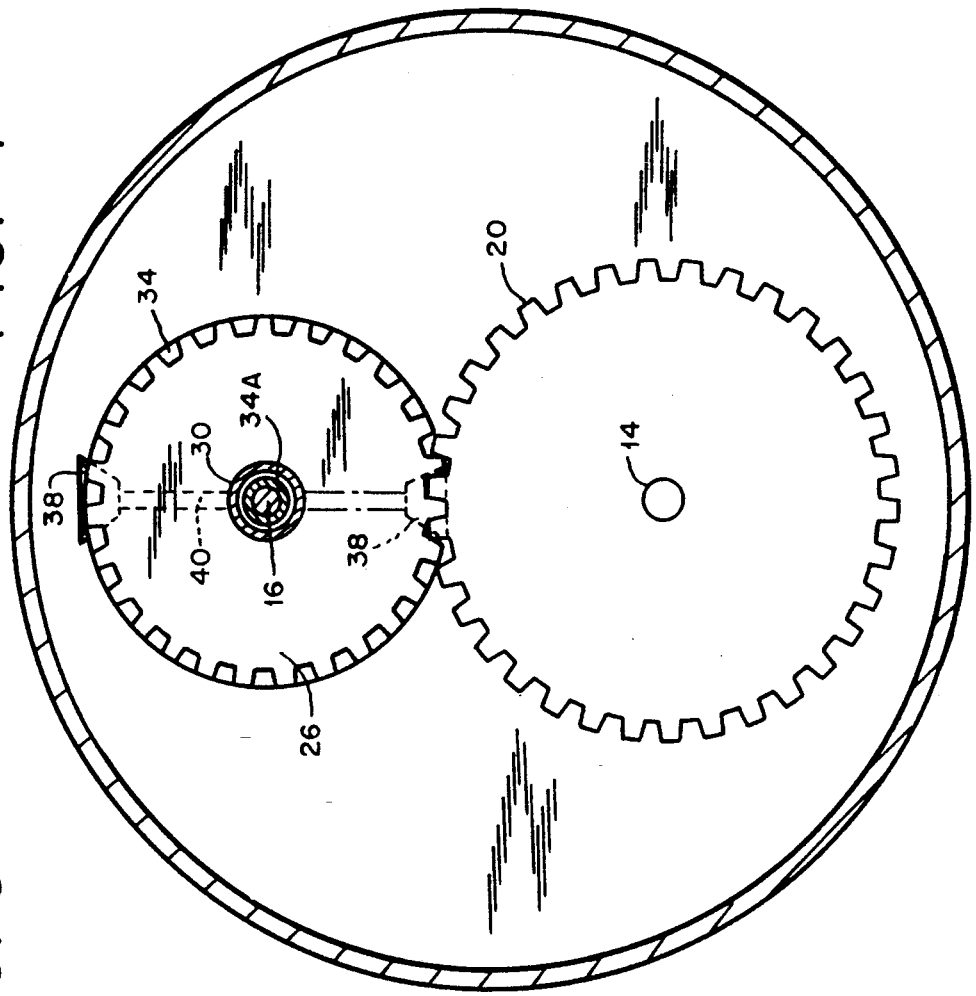
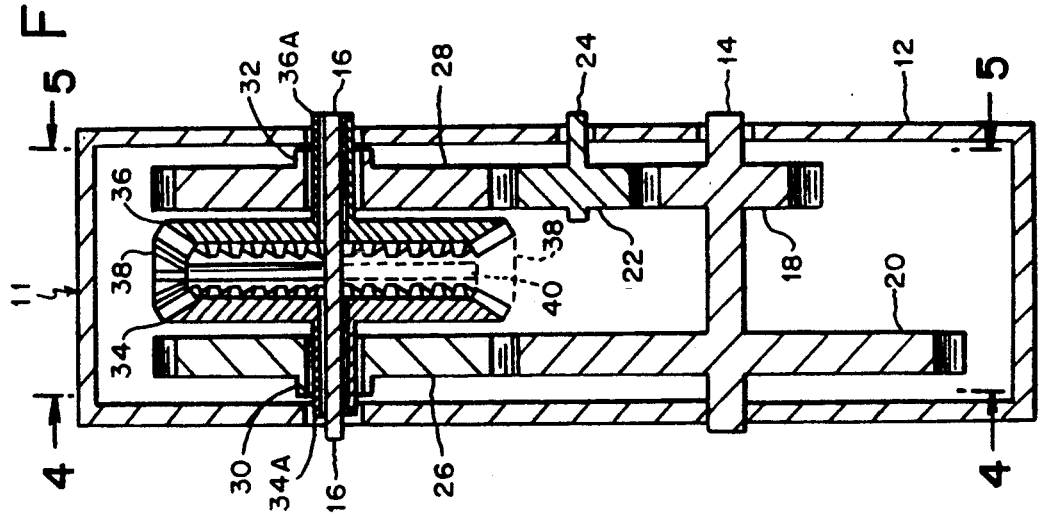

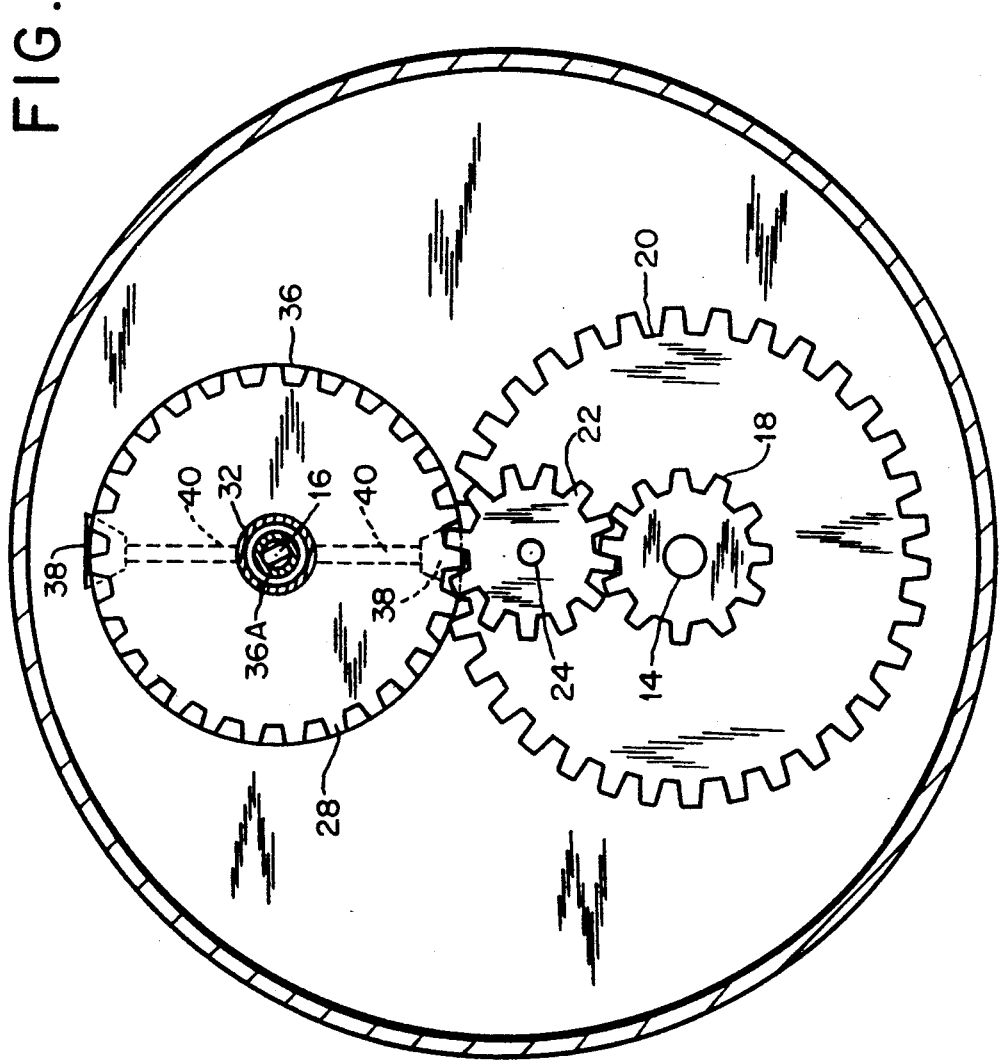

DIFFERENTIAL SPEED REDUCER

BACKGROUND OF THE INVENTION

1. Field of the Invention

The present invention relates to a differential speed reducer for extremely high speed reduction. More particularly, it relates to such a device having an input shaft and an output shaft driven by one or more orbital bevel pinions.

2. The Prior Art

Various types of speed reducers are known. One example is disclosed in F'Geppert, U.S. Pat. No. 4,310,146. The patent discloses a speed reducer mechanism which couples a motor shaft to a winding drum for use as a winch. The speed reducer includes two bevel gears driven by the motor shaft at slightly different speeds in opposite directions. A third bevel pinion gear simultaneously meshes with the oppositely rotating bevel gears so that the third gear is caused to slowly orbit around the motor shaft axis. The winding drum is carried by the third gear and thus rotates at the third gear speed. Speed reduction in the area of up to 400:1 is obtainable by use of the apparatus.

Although the patent may be useful in providing a high torque winding drum, it is not suited for other applications where the output is desirably transmitted along a shaft. In other words, an output shaft cannot be provided according to the patent due to the internal configuration of the gears.

Epicyclic gear trains are also known for use as speed reducers. In such a device, a pinion gear mounted on an arm orbits between a spur gear and a ring gear. The difference in speeds of the spur gear and ring gear cause the pinion gear to orbit, driving an output shaft connected to the arm.

SUMMARY OF THE INVENTION

It is therefore an object of the present invention to eliminate the aforementioned drawbacks of the prior art, and to provide a differential speed reducer with an extremely high reduction ratio.

It is a further object of the present invention to provide such a device which has an output shaft.

These and other related objects are attained according to the invention by a differential speed reducer having an input shaft with two spur gears of different sizes fixably mounted thereon. The smaller spur gear engages another spur gear operating as an inverter gear. The larger spur gear and the inverter gear then drive a pair of similar spur gears. Each of the similar spur gears has fixably attached to it a bevel gear. These two bevel gears face each other with their bevels. One or more orbiting bevel pinions is operatively engaged between the bevel gears and rotates an output shaft whose axis is concentric with the axes of the bevel gears.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views:

FIG. 3 is a cross-sectional view of a differential speed reducer embodying the present invention;

FIG. 4 is an elevational view of the differential speed reducer taken along the line 4—4 from FIG. 3;

FIG. 5 is an elevational view of the differential speed reducer taken along the lines 5—5 from FIG. 3.

DETAILED DESCRIPTION OF PREFERRED EMBODIMENTS

Figure 1:
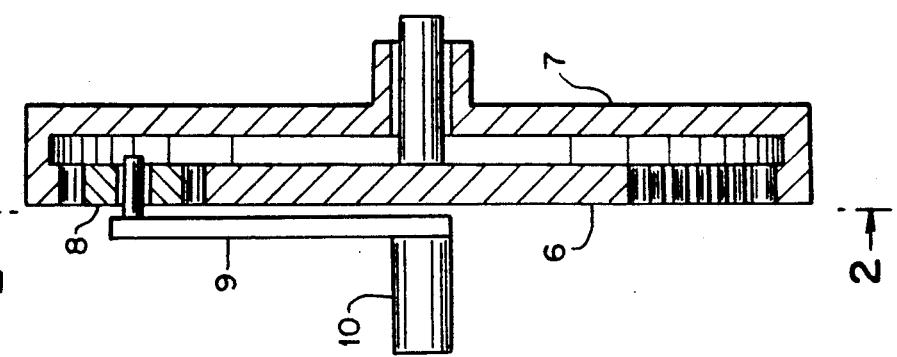
FIG. 1 is a cross-sectional view of an epicyclic train of the prior art.
Figure 2:
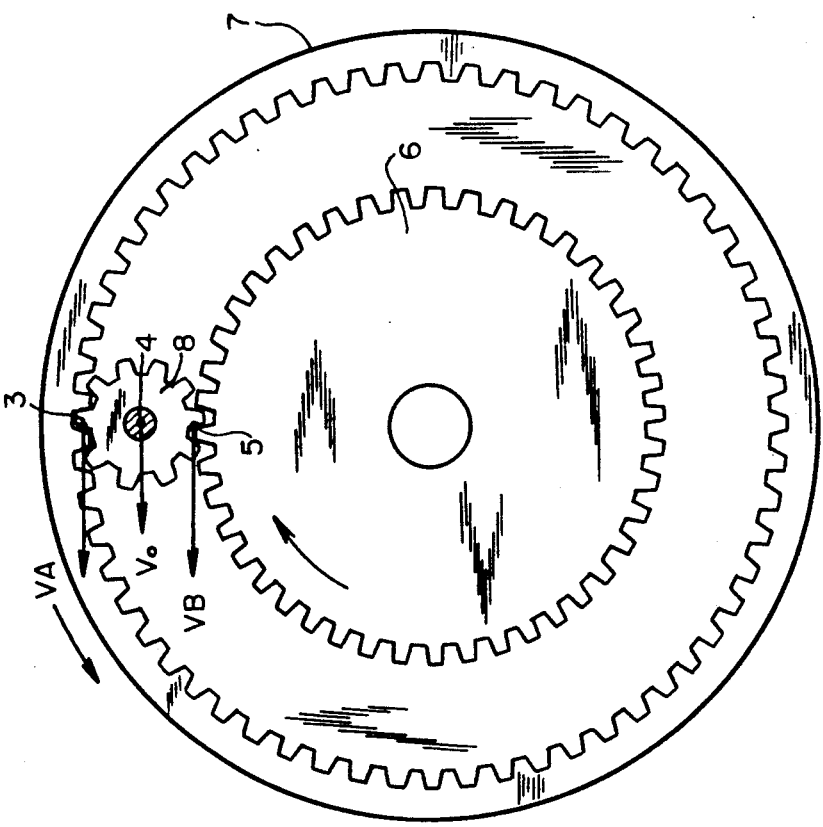
FIG. 2 is an elevational view taken along the line 2—2 from FIG. 1.

Referring now in detail to the drawings, and in particular FIGS. 1 and 2, there is illustrated an epicyclic train from the prior art with two input gears, a spur gear 6 and a ring gear 7. A pinion 8 is provided as an output gear causing an arm 9 to rotate an output shaft 10.

Referring now to FIGS. 3, 4 and 5, there is illustrated a differential speed reducer 11 embodying the present invention, with a housing 12 and input shaft 14, and an offset output shaft 16. A small spur gear 18 and a large spur gear 20 are fixably mounted to input shaft 14. Spur gear 18 drives inverter gear 22 which revolves freely around a shaft 24 which is fixably mounted to housing 12. Spur gear 20 and inverter gear 22 drive spur gear 26 and spur gear 28, respectively. Spur gears 26, 28 are of equal diameter, for example, and revolve freely around axes 30 and 32, respectively, which are attached to housing 12. Spur gear 26 is fixably attached to bevel gear 34, and spur gear 28 is fixably attached to bevel gear 36. Located between bevel gears 34 and 36 is one or more orbiting bevel pinion gears 38. Each bevel pinion 38 has associated with it a shaft 40 which extends from bevel pinion 38 down to output shaft 16.

In epicyclic trains, the speed of output shaft is equal to the vectorial sum of the speeds of the spur gear and ring gear divided by two, i.e.:

$$V_o = \frac{V_1 + V_2}{2} \quad 1)$$

Where $V_1$, $V_2$ are the inlet speeds and $V_o$ the output speed of the mentioned reducer. However, this analysis is equally applicable to the apparatus of FIGS. 3, 4 and 5. In this case $V_1$ and $V_2$ are the input speeds of the two bevel gears 34, 36 and $V_o$ the speed of the orbital bevel pinion 38.

Let $V_A$ be the vector of the instantaneous velocity of point 3 of a pinion 8 as transmitted to it by an outer ring gear 7, and $V_B$ the same for point 5, as transmitted by spur gear 6 (see FIG. 2). The resulting vector at point 4, i.e., $V_o$, is the vectorial sum of the inputs. Consider first vector $V_B=0$ (inner gear not in motion) and then vector $V_A=0$ (outer gear not in motion).

Assuming $V_B=0$, we have the vector of the instantaneous velocity for point 4 (with respect to a frame of reference of the resting part of the system) equals $V_A$ divided by two. Assuming $V_A=0$, the vector of the instantaneous velocity, with respect to a frame of reference coincident with the former one, equals $V_B$ divided by two. Thus, the resulting vector for the instantaneous velocity of the point 0 will be $$V_o = \frac{V_A = V_B}{2}$$

The reduction ratio (let us call it 'R'), is $$R = \frac{V_1}{V_o} \quad 2)$$

The vectors $V_o$, $V_1$ and $V_2$ from formulas 1) and 2) are instantaneous linear velocities. The instantaneous linear velocities can be calculated from the angular velocities.

Now let it be $V_B = -KV_A$, with K being $0 < K < 1$. Getting $V_B$ to equal $-KV_A$, can be achieved, for example, by means of an intermediate inverter gear (i.e., inverter gear 22).

Substituting now $-KV_1$ for $V_2$ in formula 1) and then the result in formula 2) for $V_o$, we arrive at the final formula $$R = \frac{2}{(1-K)}$$

From that formula we can deduce:
a) The nearer to 1 the value of K, the bigger the reduction ratio.
b) The reduction ratio is completely independent from the actual number of teeth in the pinion and the main gears as well. Note that this formula has been deduced assuming that vectors involved are linear velocities and hence angular velocities must be converted to linear velocities.

The bevel gears of the invention are ideally suited for a speed reducer because first, the pitch diameters of the gears are equal (linear an angular velocities are equivalent).

Second, and most important, there is no need to match the pitch diameters of the two ring gears and the pinion, as with cylindrical gears. As can be appreciated, the teeth may be spur, straight, spiroid, etc.

Bevel gears are advantageous in that the total amount of power being handled is divided into two parallel paths. Power will be evenly distributed between the two paths (trains of gears). This allows for a smaller module for gears 34, 36 for the same width of the gear (see FIGS. 3, 4 and 5). The module of a gear is the pitch diameter (in mm) divided by the number of teeth in the gear. In bevel gears, the pitch diameter is the diameter of a circle formed by the intersection of the pitch cone and a plane perpendicular to the axis of the gear. In other words, since a pair of gears 34, 36 are used instead of one, the diameter can be smaller for any given width. Furthermore, since the spur gears do not experience a speed reduction, the number of teeth in gears 18 and 20 may be close to the number of teeth in 28 and 26, allowing for a further decrease of the module of the gears.

Spur gears 18, 20 rotate in the same direction, for example, clockwise. Through the use of inverter gear 22, spur gears 26 and 28 are then driven in opposite directions from each other. For example, spur gear 18 driven clockwise rotates inverter gear 22 counterclockwise, which then rotates spur gear 28 clockwise. Spur gear 20 would also be rotating clockwise, in turn rotating spur gear 26 counterclockwise.

As can be appreciated, if gears 34, 36 rotate in opposite directions at the same speed, orbiting bevel pinion 38 will merely rotate on its shaft 40 and will not orbit, resulting in zero rotation of output shaft 16. The configuration of the five spur gears permits gears 26, 28 to rotate in the opposite direction at slightly different speeds. As a result, orbiting bevel pinion 38 and shaft 40 slowly orbit, thus rotating output shaft 16.

If gears 26 and 28 are of equal diameter, then the difference in speed between them is based on the difference in speed between spur gear 20 and the combined gearing of spur gear 18 and inverter gear 22. The closer this difference, the greater the reduction ratio.

The only part of the system revolving at a slow speed is the output shaft 16. The force on pinions 38 is large, but there are two paths for each pinion 38. The force is further divided by the number of pinions 38 provided. The module of pinion 38 (roughly depending upon the square root of the force exerted on the tooth) may be much less than that of the output train of a speed reducer with the same characteristics utilizing cylindrical gears.

The savings in space follows naturally from the advantages we have analyzed so far, i.e., small module (diameter of gears).

Most losses, for medium and high ratios, will be substantially lower than in a "train of gears" or "worm and worm-gear" speed reducers. Therefore, a higher efficiency can be realized with the speed reducer according to the invention. The device is capable of extremely high ratios, for example, 120,000:1.

While only one embodiment of the present invention has been shown and described, it is to be understood that many changes and modifications may be made thereunto without departing from the spirit and scope of the invention as defined in the appended claims.

What is claimed is:

1. A differential speed reducer comprising
a housing with two side walls;
an input shaft supported by both side walls;
an output shaft supported by both side walls;
a first gear and a second hear each fixedly connected to said input shaft;
a third gear mounted in a freely rotatable manner on one side wall in meshed engagement with said second gear;
a fourth gear mounted in a freely rotatable manner on said output shaft in meshed engagement with said third gear and including a fifth gear connected to said fourth gear;
a sixth gear mounted in a freely rotatable manner on said output shaft in meshed engagement with said first gear rotating in the opposite direction of said fourth gear and including a seventh gear connected to said sixth gear; and
an orbiting pinion gear freely rotatable about an axle which is fixably connected at a right angle to said output shaft and in meshed engagement with said fifth and seventh gears for rotating said output shaft at a rate dependent on the difference in speed of the oppositely rotating fifth and seventh gears.

2. The speed reducer according to claim 1, wherein said first, second, third, fourth and sixth gears are spur gears.

3. The speed reducer according to claim 2, wherein said fourth and sixth gears are of the same diameter.

4. The speed reducer according to claim 1, wherein said fifth and seventh gears are bevel gears.

5. The speed reducer according to claim 4, wherein said bevel gears are of the same diameter.

6. The speed reducer according to claim 5, wherein said orbiting pinion gear is a bevel gear.

7. The speed reducer according to claim 6, wherein said fourth and sixth gears are spur gears of the same diameter.

8. The speed reducer according to claim 7, wherein said fourth and fifth gears rotate at the same speed and said sixth and seventh gears rotate at the same speed.

9. The speed reducer according to claim 8, wherein said input shaft is parallel to said output shaft, the difference in speed of the oppositely rotating fourth and sixth gears being a function of the difference in speed of said first gear and said third gear.

* * * * *